United States Patent
Kanoh et al.

(12)

(10) Patent No.: US 6,255,037 B1
(45) Date of Patent: *Jul. 3, 2001

(54) METHOD FOR PRODUCING MONOLITHIC ELECTRONIC PARTS

(75) Inventors: Osamu Kanoh, Ohmihachiman; Yasushi Yoshida, Shiga-ken; Atsuo Senda, deceased, late of Ohtsu, by Eiko Senda, Yoshio Senda, Hiroko Senda, Masako Senda, legal representatives; Yukio Sakabe, Kyoto, all of (JP)

(73) Assignee: Murata Manufacturing Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,432

(22) Filed: Apr. 24, 1997

(30) Foreign Application Priority Data

Apr. 26, 1996 (JP) .................................................. 8-107507

(51) Int. Cl.$^7$ ..................................................... G03F 7/00
(52) U.S. Cl. .......................... 430/315; 430/313; 427/301
(58) Field of Search .................................. 430/315, 311, 430/313; 427/301, 304

(56) References Cited

U.S. PATENT DOCUMENTS

| | | | |
|---|---|---|---|
| 3,839,037 | * 10/1974 | Fromson | 96/35.1 |
| 4,072,781 | * 2/1978 | Shirahata et al. | 428/336 |
| 4,745,042 | * 5/1988 | Sasago et al. | 430/156 |
| 4,753,821 | * 6/1988 | Giesecke et al. | 427/98 |
| 4,766,671 | * 8/1988 | Utsumi et al. | 29/848 |
| 4,910,072 | * 3/1990 | Morgan et al. | 428/212 |
| 4,910,118 | * 3/1990 | Adair et al. | 430/138 |
| 5,100,693 | * 3/1992 | Eisch et al. | 427/54.1 |
| 5,126,921 | * 6/1992 | Fujishima et al. | 361/525 |
| 5,281,447 | * 1/1994 | Brady et al. | 427/555 |
| 5,506,091 | * 4/1996 | Suzuki et al. | 430/324 |
| 5,565,235 | * 10/1996 | Baudrand et al. | 427/98 |
| 5,746,809 | * 5/1998 | Kanoh et al. | 106/1.11 |
| 5,746,903 | * 5/1998 | Beilin et al. | 205/118 |

FOREIGN PATENT DOCUMENTS

| | | |
|---|---|---|
| 687136 | * 12/1995 | (EP) . |
| 61-77393 | 4/1986 | (JP) . |
| 63-169015 | 7/1988 | (JP) . |
| 7336018 | 12/1995 | (JP) . |

* cited by examiner

Primary Examiner—Kathleen Duda
(74) Attorney, Agent, or Firm—Ostrolenk, Faber, Gerb & Soffen, LLP (57) ABSTRACT

Inexpensive methods for producing small-sized monolithic electronic parts with improved functions by which an electroconductive film can be formed uniformly, thin, and in fine patterns on a ceramic green sheet, a carrier film, or a resin film, for example. A plurality of such ceramic green sheets, etc., each having the electroconductive film formed thereon, are laminated to give a ceramic laminate, which is then sintered. The electroconductive film is formed on each ceramic green sheet, etc., by the steps of: applying a hydrophilic liquid containing an activating catalyst comprising copper oxide, a palladium salt and an alkaline solution, for example, to thereby form a photosensitive film comprising said liquid containing said activating catalyst, exposing the photosensitive predetermined regions to thereby deposit palladium catalyst on said regions, washing out the non-exposed regions of the photosensitive film with water or a liquid consisting essentially of water, and dipping the ceramic green sheet having palladium catalyst deposited thereon in an electroless plating bath to thereby form the intended electroconductive film by electroless plating.

10 Claims, 3 Drawing Sheets

METHOD FOR PRODUCING MONOLITHIC ELECTRONIC PARTS

FIELD OF THE INVENTION

The present invention relates to a method for producing monolithic electronic parts, such as monolithic capacitors, monolithic coils, monolithic piezoelectric parts, monolithic varistors, etc. More precisely, it relates to a method for producing such monolithic electronic parts through electroless plating of conductive layers.

BACKGROUND OF THE INVENTION

To produce a monolithic capacitor, which is one example of a monolithic electronic part, the following methods have been being employed.

One method comprises forming an electroconductive inner electrode film on a ceramic green sheet, preparing a plurality of such ceramic green sheets each having the electroconductive film formed thereon, laminating these ceramic green sheets to obtain a ceramic laminate, then sintering the ceramic laminate, and thereafter attaching, to said sintered ceramic laminate, electroconductive films to provide outer electrodes, thereby to finally obtain a monolithic capacitor. To form the electroconductive inner electrode film on the ceramic green sheet in this method, screen-printing is generally employed. (This method is hereinafter referred to as "prior art method 1".)

In general, monolithic capacitors of this type are required to be small-sized while having a large capacitance. In order to produce such small-sized monolithic capacitors having a large capacitance, generally, the ceramic green sheets and also the inner electrode electroconductive films are made thin.

However, there is a limit to how thin and uniform the electroconductive films can be made on ceramic green sheets by screen-printing. When a plurality of such ceramic green sheets, each having an electroconductive film screen-printed thereon, are laminated to give a ceramic laminate, the difference in thickness between the area of the ceramic green sheet having the electroconductive film formed thereon and the area thereof not having the film brings about a difference in level therebetween. The difference in level often has an influence on the electrical characteristics of the monolithic capacitor comprising the ceramic laminate. This problem is more serious when the thickness of the ceramic green sheets is smaller.

In order to solve this problem, studies are being made of employing electroless plating, in place of screen-printing, for forming electroconductive films to be inner electrodes on ceramic green sheets.

One electroless plating method for forming an electroconductive film to provide an inner electrode on a ceramic green sheet is as follows:

An electroconductive film is formed on the whole surface of a carrier film, such as a polyester film, through electroless plating, and then this is etched to give a pattern having a desired profile. Next, a ceramic green sheet is formed over the carrier film having thereon such a patterned electroconductive film, and thereafter the carrier film is peeled off from the ceramic green sheet, whereby the electroconductive film is transferred onto the ceramic green sheet. In that manner, a ceramic green sheet is obtained having an electroconductive inner electrode film formed thereon. (This method is hereinafter referred to as "prior art method 2".)

Another electroless plating method is as follows:

As disclosed in Japanese Patent Application Laid-Open No. 63-169015, the disclosures of which are incorporated by reference, a liquid comprising an activating catalyst is applied onto a ceramic green sheet selectively at predetermined areas thereof by stamping or printing equipment, and then the ceramic green sheet is dipped in an electroless plating bath to thereby form an electroconductive inner electrode film on the selected areas of the ceramic green sheet coated with the activating catalyst liquid. (This method is hereinafter referred to as "prior art method 3".)

According to the above-mentioned electroless plating methods of forming electroconductive films, more uniform and thinner electroconductive films can be formed on ceramic green sheets than those formed according to the prior art screen-printing method 1. Therefore, when a plurality of the ceramic green sheets each having such a more uniform and thinner electroconductive film formed thereon are laminated to give a ceramic laminate, the resulting ceramic laminate is prevented from having a difference in level between the non-coated area and the coated area in each sheet.

However, the conventional electroless plating methods for forming electroconductive films have some problems such as those mentioned below.

First, in the prior art method 2, since the electroconductive film formed on the whole surface of the carrier film is etched to give a pattern having a desired profile, large amounts of organic solvents and acids must be used. Such organic solvents and acids bring about an increase in the cost of production. In addition, large amounts of organic acids and acids used often dissolve or swell the carrier film.

On the other hand, in the prior art method 3, the liquid of an activating catalyst is applied onto the ceramic green sheet selectively at predetermined areas by stamping or printing equipment. The use of stamping and printing equipment imposes limits on the available resolution and accuracy in the positions to be selected. Therefore, fine, precision patterns are difficult to obtain.

SUMMARY OF THE INVENTION

Accordingly, an advantageous feature of the present invention is to provide a method for inexpensively producing monolithic electronic parts, by which uniform and thin electroconductive films can be formed into fine and precision patterns, by which small-sized, monolithic electronic parts having improved functions can be obtained.

Three embodiments of the method for producing monolithic electronic parts will be described below.

The first embodiment of the present invention comprises the steps of: preparing ceramic green sheets, forming an electroconductive film on each ceramic green sheet, laminating a plurality of such ceramic green sheets each having the electroconductive film formed thereon to give a ceramic laminate, and sintering the ceramic laminate. The step of forming an electroconductive film on each ceramic green sheet comprises the steps of: applying a hydrophilic liquid of an activating catalyst onto each ceramic green sheet to form thereon a photosensitive film of said hydrophilic liquid of an activating catalyst, exposing said photosensitive film to light to thereby deposit the activating catalyst on said film, and dipping said ceramic green sheet thus having the activating catalyst deposited thereon in an electroless plating bath to thereby form the intended electroconductive film on said ceramic green sheet through electroless plating in said bath.

The second embodiment of the present invention comprises the steps of: preparing a long carrier film strip, forming an electroconductive film on the carrier film strip, forming a ceramic green sheet over the carrier film strip having the electroconductive film formed thereon, peeling the carrier film strip from the ceramic green sheet to thereby transfer the electroconductive film onto the ceramic green sheet, laminating a plurality of such ceramic green sheets each having the electroconductive film transferred thereonto to prepare a ceramic laminate, and sintering said ceramic laminate. The step of forming an electroconductive film on a long carrier film strip comprises the steps of: applying a hydrophilic liquid of an activating catalyst onto said carrier film strip to form thereon a photosensitive film of said hydrophilic liquid of an activating catalyst, exposing said photosensitive film to light to thereby deposit the activating catalyst on said film, and dipping said carrier film strip thus having the activating catalyst deposited thereon in an electroless plating bath to thereby form the intended electroconductive film on said carrier film strip through electroless plating in said bath.

The third embodiment of the present invention comprises the steps of: preparing resin films, forming an electroconductive film on each resin film, and laminating a plurality of such resin films each having the electroconductive film formed thereon to give a resin film laminate. The step of forming an electroconductive film on each resin film comprises the steps of: applying a hydrophilic liquid of an activating catalyst onto each resin film to form thereon a photosensitive film of said hydrophilic liquid of an activating catalyst, exposing said photosensitive film to light to thereby deposit the activating catalyst on said film, and dipping said resin film thus having the activating catalyst deposited thereon in an electroless plating bath to thereby form the intended electroconductive film on said resin film through electroless plating in said bath.

In the first, second and third embodiments of the present invention, the photosensitive film is exposed to light to thereby deposit an activating catalyst, and thereafter, the ceramic green sheet, the carrier film or the resin film thus having the activating catalyst deposited thereon is subjected to electroless plating to form the intended electroconductive film thereon. According to these methods, therefore, thinner and more precision electroconductive film patterns with a higher resolution can be formed with higher accuracy in the positions to be selected for said patterns, than those to be formed according to the stamping or printing method of the prior art method 3.

In addition, in the first, second and third embodiments of the present invention, since the liquid of an activating catalyst to be used is hydrophilic, the intended electroconductive film can be formed through aqueous processing without using any organic solvent.

Moreover, in the first and second embodiments of the present invention, since the electroconductive film is formed through electroless plating, it is more uniform and thinner than the electroconductive film to be formed according to the screen-printing method of the prior art method 1.

In the first embodiment of the present invention, it is desirable for the ceramic green sheet to be formed on a long carrier film strip continuously in its lengthwise direction, and for the carrier film to be peeled from the ceramic green sheet prior to the step of laminating a plurality of such ceramic green sheets to give a ceramic laminate. In this case, since each ceramic green sheet is supported by the carrier film strip to ensure its mechanical strength, just before the step of laminating a plurality of these ceramic green sheets, the ceramic green sheets can be handled with ease.

In the first, second and third aspects of the present invention, it is desirable for said liquid of an activating catalyst to be a hydrophilic liquid comprising copper oxalate, a palladium salt and an alkaline solution, or a hydrophilic liquid comprising zinc oxalate, a copper salt, a palladium salt and an alkaline solution.

The activating catalyst of this type is highly sensitive to light. Therefore, even when the energy of the light, such as ultraviolet radiation, is small, or even when the exposure time is short, the activating catalyst can be satisfactorily deposited in the photosensitive film.

In addition, the electroconductive film formed through electroless plating using the activating catalyst of this type can have a preferable adhesion strength.

In the first, second and third embodiments of the present invention, it is desirable that, in the step of exposing the photosensitive film to light to thereby deposit the activating catalyst thereon, said photosensitive film is exposed to light selectively only at predetermined areas and the non-exposed areas of said photosensitive film are removed by washing them with water or a liquid consisting essentially of water.

In this case, a large amount of water or a liquid consisting essentially of water can be used to wash out the non-exposed areas of the photosensitive film. Therefore, it is easy to completely remove the unnecessary photosensitive film to thereby increase the resolution of the electroconductive film patterns to be formed.

In addition, in this case, even if water used in the development step remains on the processed film, it does not have any negative influence on the next electroless plating step. Thus, the electroless plating step can be carried out immediately after the development step.

Other features and advantages of the present invention will become apparent from the following description of embodiments of the invention which refers to the accompanying drawings.

EMBODIMENTS OF THE INVENTION

Three embodiments of the method of the present invention for producing monolithic electronic parts are described below, with reference to the drawings attached hereto.

In the Figures, 1 and 11 each represent a carrier film; 2 represents a ceramic green sheet; 3, 13 and 23 each represent a photosensitive film; 4, 14 and 24 each represent an activating catalyst, palladium catalyst; 5, 15 and 25 each represent an electroconductive film; and 22 represents a resin film.

EXAMPLE 1

Following is a description of the first embodiment of the present invention which is a method for producing monolithic electronic parts. In this embodiment, the method is applied to the production of a monolithic capacitor which is an example of monolithic electronic part.

First, a ceramic green sheet is continuously formed on a long carrier film strip in its lengthwise direction. A polyester film can be employed as the carrier film, for example.

To form the ceramic green sheet on the carrier film strip, for example, a ceramic slurry may be applied onto said carrier film strip with a doctor blading apparatus, and dried thereon. The thickness of the dried ceramic green sheet may be from 5 $\mu$m to 50 $\mu$m. The ceramic slurry may be prepared, for example, by dispersing a powdery raw material containing an oxide, such as barium titanate, in a solvent comprising ethanol and toluene along with a binder, polyvinylbutyral.

Next, on the ceramic green sheet supported by the carrier film strip, an electroconductive film is formed with an electroless plating apparatus, for serving as an inner electrode. The details of this step will be described below.

Next, a plurality of such ceramic green sheets each having an electroconductive film formed thereon, which are produced in the manner as above, are laminated to give a ceramic laminate.

This lamination may be conducted according to any known processing step, such as that described in Japanese Patent Publication No. 7-54779, the disclosures of which are incorporated by reference.

Briefly, the ceramic green sheets, each supported by the carrier film strip, along with the electroconductive film formed thereon, are cut into a predetermined form with a cutting head provided with an internal suction system. In this step, the carrier film strip is not cut. Next, each cut ceramic green sheet is peeled from the carrier film strip by the action of the suction system in said cutting head, and is separated from the other ceramic green sheets. The ceramic green sheet thus peeled from the carrier film strip is then laminated on another ceramic green sheet which has also been peeled from the carrier film strip in the same manner as above. This lamination is repeated to obtain the final ceramic laminate composed of a plurality of such ceramic green sheets.

The ceramic green sheets may be laminated in a space adjacent to the cutting zone in the cutting head, or alternatively, may be laminated in a separate lamination zone after having been transferred thereto by the cutting head.

Next, the thus-formed ceramic laminate is optionally pressed, and then cut into a predetermined form. Thus are obtained ceramic laminate chips.

Next, these ceramic laminate chips are sintered in an oxidizing or neutral atmosphere at from 1100 to 1400° C. After this, outer electrodes are formed at the sides of the thus-sintered ceramic laminate chips. Thus are obtained monolithic capacitors. The binder (polyvinylbutyral) existing in the ceramic green sheets constituting the ceramic laminate chips is burnt out when said chips are sintered.

Now, the details of the electroless plating step for forming the electroconductive film on the ceramic green sheet supported by the carrier film strip will be described.

FIG. 1(a) to FIG. 1(d) illustrate one embodiment of the electroless plating step for forming an electroconductive film on a ceramic green sheet supported by a carrier film strip.

Figure 1A:
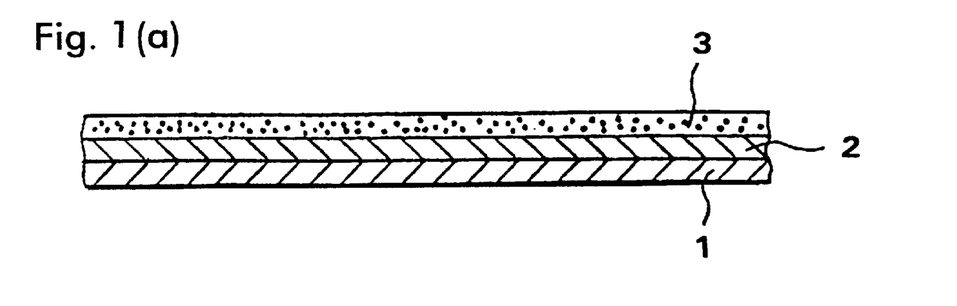
FIGS. 1(a) to 1(d) illustrate a first embodiment of the present invention for producing monolithic electronic parts, graphically showing a series of steps for forming an electroconductive film on a ceramic green sheet.

First, as shown in FIG. 1(a), a hydrophilic liquid of an activating catalyst is applied onto the ceramic green sheet 2 formed on the carrier film strip 1, by roller coating or spraying, and then dried to form thereon a photosensitive film 3 of said liquid of an activating catalyst.

Since the liquid of an activating catalyst used herein is hydrophilic, it neither dissolves nor swells the carrier film strip 1 made of a polyester film, nor even the binder of polyvinylbutyral existing in the ceramic green sheet 2.

As the liquid of an activating catalyst, a hydrophilic liquid comprising copper oxalate, a palladium salt and an alkaline solution is used.

As the palladium salt, palladium chloride can be used. As the alkaline solution, aqueous ammonia can be used.

Figure 1B:
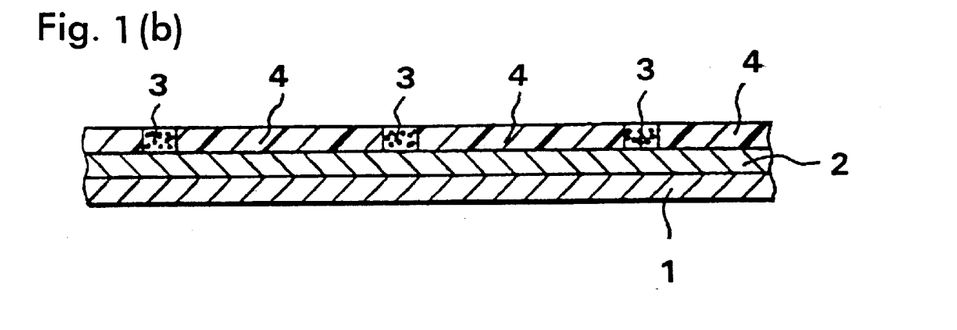

Next, as shown in FIG. 1(b), the photosensitive film 3 is exposed to ultraviolet rays from an excimer lamp (wavelength: 172 nm) for 20 seconds, via a chromium quartz photo-mask, whereby palladium catalyst 4 is deposited on the areas on which the intended electroconductive film is to be formed.

Figure 1C:
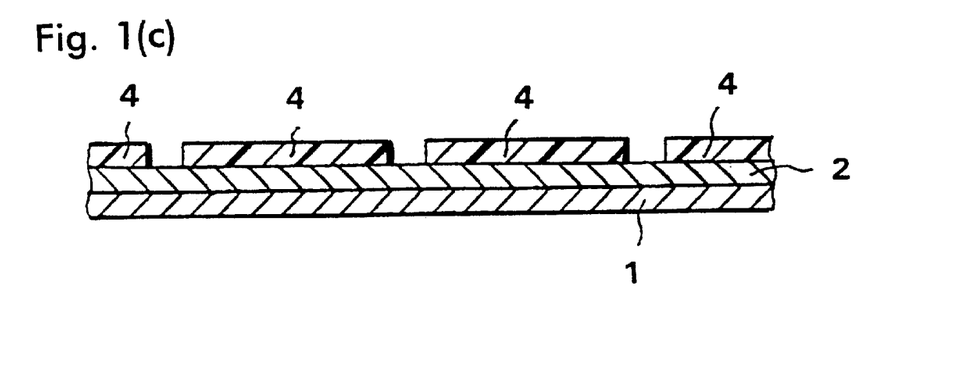

Next, as shown in FIG. 1(c), the non-exposed areas in the photosensitive film 3 are washed away, using water or a liquid consisting essentially of water.

The photosensitive film 3 can be developed by the use of water or a liquid consisting essentially of water, since the liquid of the activating catalyst used herein is hydrophilic. Therefore, neither the carrier film strip 1 made of a polyester film nor the binder of polyvinylbutyral existing in the ceramic green sheet 1 is dissolved or swollen by the developer used.

Figure 1D:
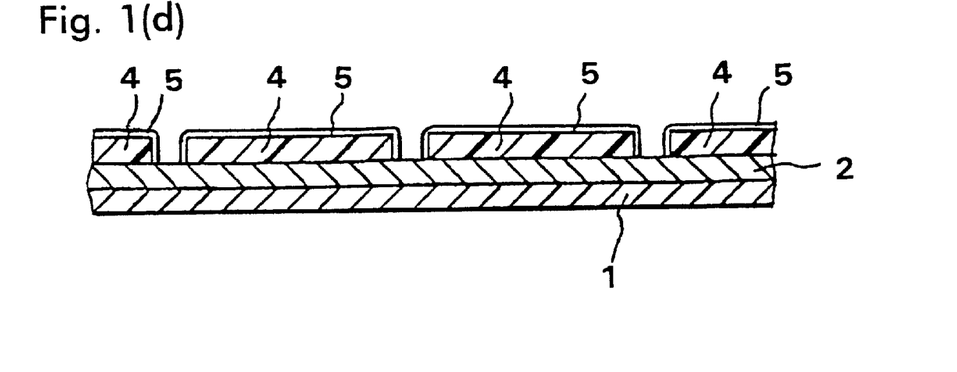

Next, as shown in FIG. 1(d), the ceramic green sheet 2 thus having the deposit of palladium catalyst 4 formed thereon is dipped in an electroless plating bath (60° C.) containing silver and palladium for 10 minutes, whereby the areas of the ceramic green sheet 2 coated with the palladium catalyst 4 are plated by electroless plating. Thus the electroconductive film 5 for serving as an inner electrode is formed on the ceramic green sheet 2 supported by the carrier film strip 1.

In FIG. 1(d), the thickness of the palladium catalyst 4 and that of the electroconductive film 5 are drawn larger than actual size in order to graphically emphasize said palladium catalyst 4 and electroconductive film 5. In fact, however, these layers 4 and 5 can be made as thin as possible, to such a degree that they do not produce any difference in level in the ceramic laminate which is formed when a plurality of the thus-coated ceramic green sheets are laminated. In fact, in addition, the electroconductive film 5 is formed to be thicker than the palladium catalyst 4.

EXAMPLE 2

The second embodiment of the present invention is also a method for producing a monolithic capacitor which is an example of a monolithic electronic part.

First, electroconductive film for serving as an inner electrode is formed on a long carrier film strip by electroless plating. The carrier film, for example, may be a polyester film. The details of this step are described below.

Next, a ceramic green sheet is formed on said carrier film strip over the electroconductive film, continuously in the lengthwise direction of said carrier film strip. To form the ceramic green sheet, for example, a ceramic slurry is applied onto said carrier film strip with a doctor blading apparatus, and dried thereon. The thickness of the dried ceramic green sheet may be from 5 $\mu$m to 50 $\mu$m. The ceramic slurry may be prepared, for example, by dispersing a powdery raw material containing an oxide, such as barium titanate, in a solvent comprising ethanol and toluene along with a binder, polyvinylbutyral.

Next, the carrier film strip is peeled off from the ceramic green sheet, whereupon the electroconductive film is transferred from said carrier film strip onto the ceramic green sheet.

Next, a plurality of such ceramic green sheets each having an electroconductive film formed thereon, which are produced in the manner as above, are laminated to give a ceramic laminate.

The step of transferring the electroconductive film from the carrier film strip onto the ceramic green sheet and the step of laminating a plurality of such ceramic green sheets each having an electroconductive film formed thereon may be carried out continuously, for example, in the manner mentioned below.

The ceramic green sheet and the electroconductive film both supported by the carrier film strip are cut into a predetermined form, using a cutting head provided with an internal suction system. In this step, the carrier film strip is not cut. Next, each ceramic green sheet thus cut to have such a predetermined form is peeled from the carrier film strip by the action of the suction system in said cutting head, and is separated from the other ceramic green sheet. In this, the electroconductive film is peeled from the carrier film strip along with the ceramic green sheet and is thus transferred onto the ceramic green sheet. The ceramic green sheet thus peeled from the carrier film strip is then laminated on another ceramic green sheet which has also been peeled from the carrier film strip in the same manner as above. This lamination is repeated to obtain the final ceramic laminate composed of a plurality of such ceramic green sheets.

The ceramic green sheets may be laminated in a space in the cutting zone in the cutting head, or alternatively, may be laminated in a separate lamination zone after having been transferred thereinto from the cutting head.

Next, the thus-formed ceramic laminate is optionally pressed, and then cut into a predetermined form. Thus are obtained ceramic laminate chips.

Next, these ceramic laminate chips are sintered in an oxidizing or neutral atmosphere at from 1100 to 1400° C. After this, outer electrodes are formed at the sides of the thus-sintered ceramic laminate chips. Thus are obtained monolithic capacitors. The binder (polyvinylbutyral) existing in the ceramic green sheets constituting the ceramic laminate chips is burnt out when said chips are sintered.

Now, the details of the electroless plating step of forming the electroconductive film on the carrier film strip are mentioned will be described below.

FIG. 2(a) to FIG. 2(d) illustrate one embodiment of the electroless plating step of forming an electroconductive film to be an inner electrode on a carrier film strip.

Figures 2A, 2B, 2C, 2D:
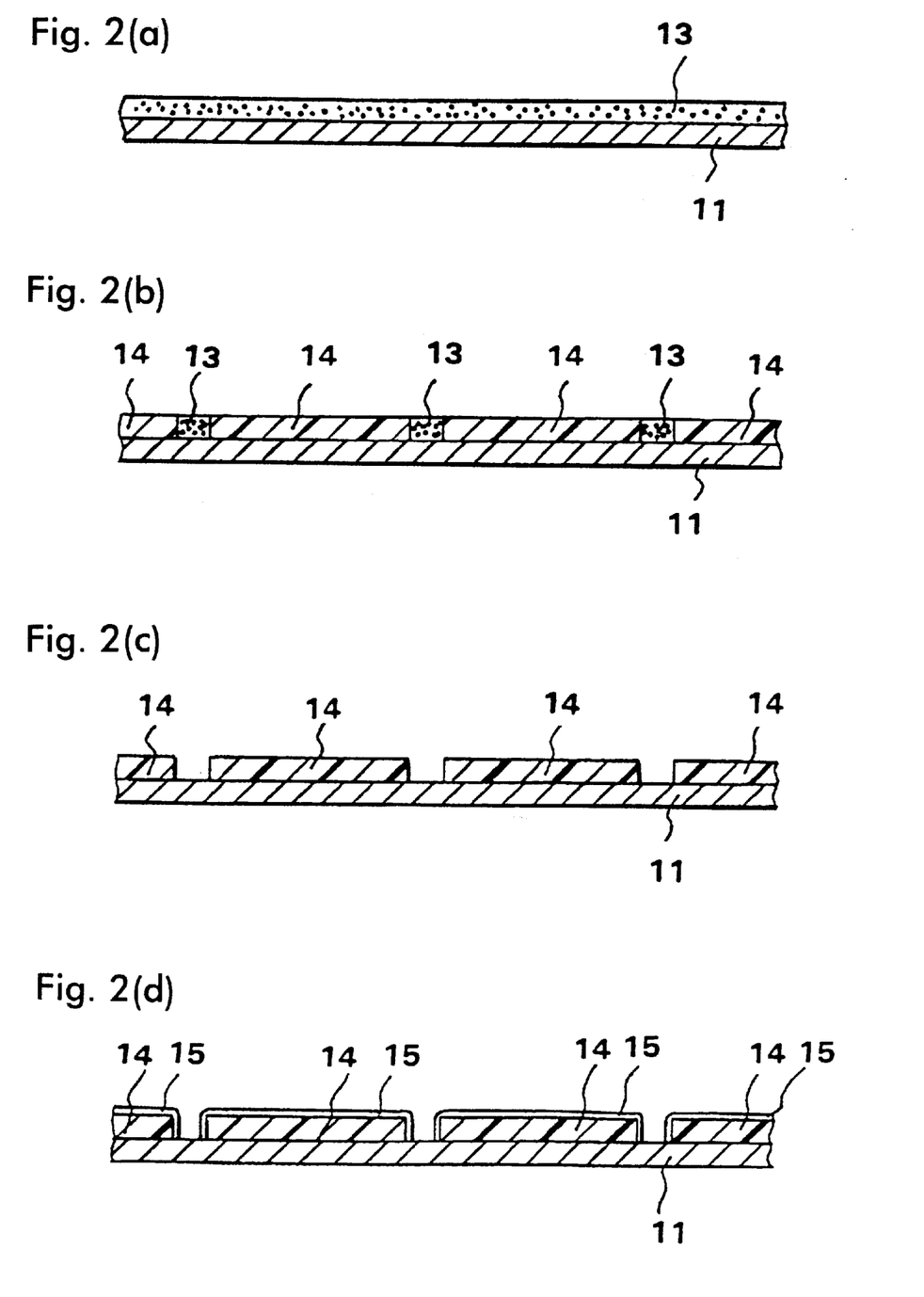
FIGS. 2(a) to 2(d) illustrate a second embodiment of the present invention for producing monolithic electronic parts, graphically showing a series of steps for forming an electroconductive film on a carrier film.

First, as shown in FIG. 2(a), a hydrophilic liquid of an activating catalyst is applied onto the carrier film strip 11, by roller coating or spraying, and then dried to form thereon a photosensitive film 13 of said liquid of an activating catalyst.

Since the liquid of an activating catalyst used herein is hydrophilic, it neither dissolves nor swells the carrier film strip 11 made of a polyester film.

The liquid of an activating catalyst is a hydrophilic liquid comprising copper oxalate, a palladium salt and an alkaline solution.

As the palladium salt, palladium chloride can be used. As the alkaline solution, aqueous ammonia can be used.

Next, as shown in FIG. 2(b), the photosensitive film 13 is exposed to ultraviolet rays from an excimer lamp (wavelength: 172 nm) for 20 seconds, via a chromium quartz photo-mask, whereby palladium catalyst 14 is deposited on the areas on which the intended electroconductive film is to be formed.

Next, as shown in FIG. 2(c), the non-exposed areas in the photosensitive film 13 are washed away, using water or a liquid consisting essentially of water.

The film 13 can be developed by the use of water or a liquid consisting essentially of water, since the liquid of the activating catalyst used herein is hydrophilic. Therefore, the carrier film strip 11 made of a polyester film is neither dissolved nor swollen by the developer used.

Next, as shown in FIG. 2(d), the carrier film strip 11 thus having the deposit of palladium catalyst 14 formed thereon is dipped in an electroless plating bath (60° C.) containing silver and palladium for 10 minutes, whereby the areas of the carrier film strip 11 coated with the palladium catalyst deposit 14 are plated by electroless plating. Thus is formed the electroconductive film 15 on the carrier film 11.

In FIG. 2(d), the thickness of the palladium catalyst 14 and that of the electroconductive film 15 are drawn larger than actual size in order to graphically emphasize said palladium catalyst 14 and electroconductive film 15. In fact, however, these layers 14 and 15 can be as thin as possible to such a degree that they do not produce any difference in level in the ceramic laminate formed by laminating a plurality of coated ceramic green sheets. In fact, in addition, the electroconductive film 15 is formed to be thicker than the palladium catalyst 14.

EXAMPLE 3

The third embodiment of the present invention is a method for producing a monolithic coil which is another example of a monolithic electronic part.

First, an electroconductive film is formed on a resin film having through-holes, by electroless plating. The resin film may be, for example, any epoxy film or polyimide film. The electroconductive film is formed spirally and continuously on the surface of said resin film, and also on the back surface thereof and the inner surface of each through-hole. The spiral electroconductive film formed on the surface of the resin film is electrically connected to the electroconductive film formed on the back surface thereof, via the electroconductive film formed on the inner surface of each through-hole. The details of this step will be described below.

Next, a plurality of such resin films each having such an electroconductive film are laminated to give a resin film laminate. The plurality of resin films are bonded to each other through thermal pressure or by means of an adhesive comprising a polyimide. With an adhesive comprising a polyimide, the resulting resin film laminate may have good moisture resistance and good heat resistance and be highly reliable. The spiral electroconductive films formed on the surfaces of the adjacent resin films are electrically connected to each other via the electroconductive films formed on the back surfaces thereof and the electroconductive film formed on the inner surface of each through-hole. Thus is obtained a monolithic coil.

Now, the details of the electroless plating step for forming the electroconductive film over the resin film will be described.

FIG. 3(a) to FIG. 3(d) illustrate the third embodiment of the electroless plating step, for forming an electroconductive film over a resin film.

Figure 3A:
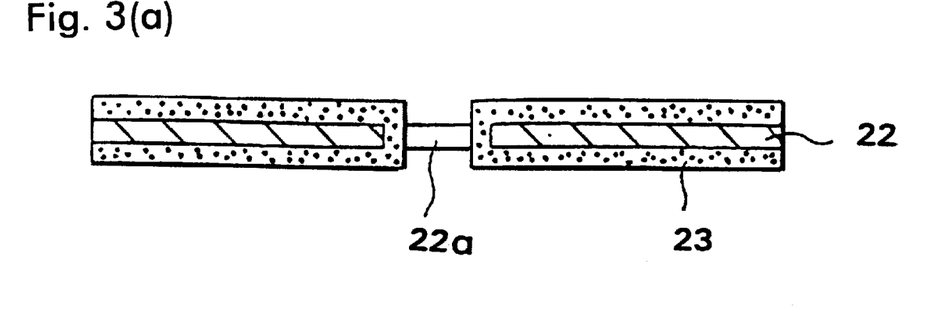
FIGS. 3(a) to 3(d) illustrate a third embodiment of the present invention for producing monolithic electronic parts, graphically showing a series of steps for forming an electroconductive film on a resin film.

First, as shown in FIG. 3(a), a hydrophilic liquid of an activating catalyst is applied onto both surfaces of the resin film 22 and onto the inner surface of each through-hole 22a, by spin coating at 1000 rpm for 30 seconds, and then dried to form a photosensitive film 23 of said liquid of an activating catalyst over said resin film 22.

Since the liquid of an activating catalyst used herein is hydrophilic, it neither dissolves nor swells the resin film 22 made of an epoxy film or a polyimide film.

As the liquid of an activating catalyst, a hydrophilic liquid comprising copper oxalate, a palladium salt and an alkaline solution is used.

As the palladium salt, palladium chloride can be used. As the alkaline solution, aqueous ammonia can be used.

Figure 3B:
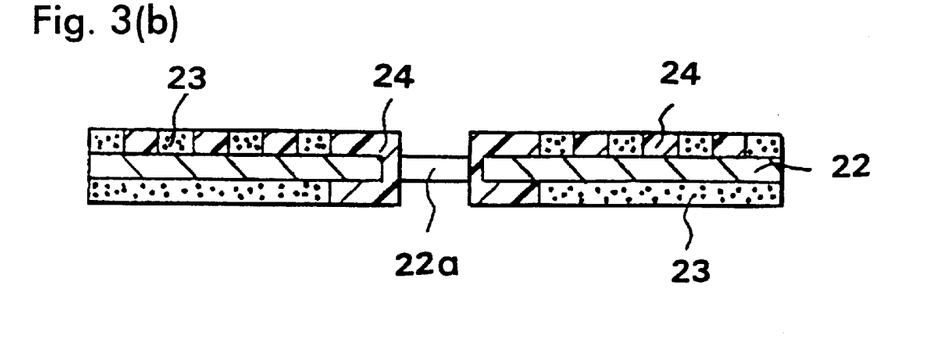

Next, as shown in FIG. 3(b), the photosensitive film 23 is exposed to ultraviolet rays from an excimer lamp (wavelength: 172 nm) for 20 seconds, via a chromium quartz photo-mask. Then, the resin film 22 is turned upside down, and the photosensitive film 23 formed on its back surface is exposed to the same ultraviolet radiation for 20 seconds in the same manner as before. Thus, palladium catalyst 24 is deposited on the predetermined areas of the photosensitive film 23. Thus, by exposing the coated resin film 22 in the above manner, it is easy to form the palladium catalyst deposit 24 even on the photosensitive film 23 formed on the inner surface of each through-hole 22a.

Figure 3C:
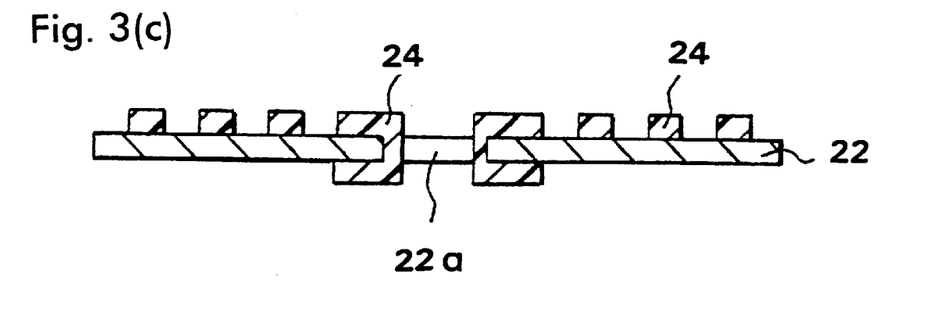

Next, as shown in FIG. 3(c), the non-exposed areas in the photosensitive film 23 are washed away, using water or a liquid consisting essentially of water. The film 23 can be developed by the use of water or a liquid consisting essentially of water, since the liquid of the activating catalyst used herein is hydrophilic. Therefore, the resin film 22 made of an epoxy film or a polyimide film is neither dissolved nor swollen by the developer used.

Figure 3D:
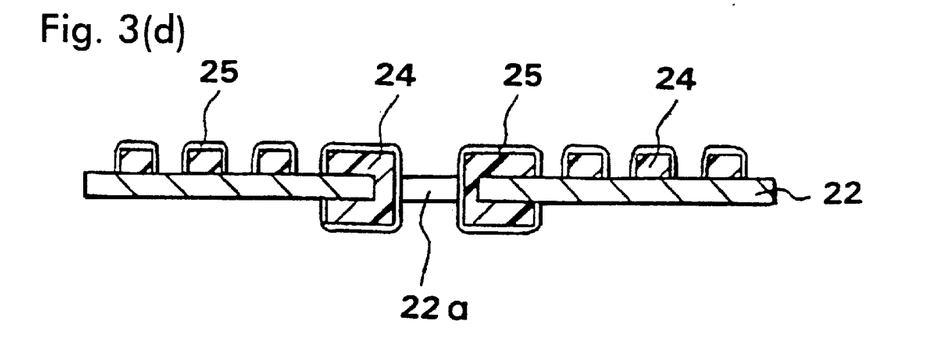

Next, as shown in FIG. 3(d), the resin film 22 thus having the deposit of palladium catalyst 24 formed thereon is dipped in an electroless plating bath (60° C.) containing silver and palladium for 10 minutes, whereby the areas of the resin film 22 as coated with the palladium catalyst 24 are plated by electroless plating. Thus the electroconductive film 25 is formed on the predetermined areas of the resin film 22.

In FIG. 3(d), the thickness of the palladium catalyst 24 and that of the electroconductive film 25 are drawn larger than actual size in order to graphically emphasize said palladium catalyst 24 and electroconductive film 25. In fact, however, these layers 24 and 25 can be as thin as possible to such a degree that they do not produce any difference in level in the resin laminate to be formed by laminating a plurality of coated resin films. In fact, in addition, the electroconductive film 25 is formed to be thicker than the palladium catalyst 24.

The above first, second and third embodiments of the present invention, which relate to methods for producing monolithic electric parts, are not intended to restrict the scope of the invention. Needless-to-say, the present invention shall include any modifications of the examples illustrated herein without overstepping the spirit and the scope of the invention.

For example, in the above-mentioned Example 1, Example 2 and Example 3, a hydrophilic liquid comprising copper oxalate, a palladium salt and an alkaline solution is used as the hydrophilic liquid of an activating catalyst. However, the invention is not limited to the use of that hydrophilic liquid. For example, a hydrophilic liquid comprising zinc oxalate, a copper salt, a palladium salt and an alkaline solution can also be used. In this case, the palladium salt may be palladium chloride. The alkaline solution may be aqueous ammonia or a solution comprising a sodium salt or a potassium salt. Zinc oxalate may be replaced by any other zinc salt. The zinc salt may include, for example, zinc chloride and zinc sulfate. The copper salt may include, for example, copper oxalate, copper chloride, copper sulfate and copper nitrate.

In the above-mentioned Example 1, Example 2 and Example 3, the photosensitive films 3, 13 and 23 are exposed to ultraviolet rays to thereby make the films have palladium catalyst 4, 14 and 24, respectively, deposited thereon, and thereafter the non-exposed areas of the photosensitive films 3, 13 and 23 are washed away with water or a liquid consisting essentially of water. However, the invention does not always require this step. In other words, if the resolution of the patterned electroconductive film to be formed is not required to be so high, the developing step of washing with water may be omitted. The reason why the developing step of washing with water can be omitted is because the liquid of an activating catalyst used is hydrophilic.

In the above-mentioned Example 1, Example 2 and Example 3, silver and palladium are plated by an electroless plating technique. However, in addition to silver and palladium, any other metal, such as nickel, copper, gold or platinum, can be electrolessly plated herein in the same manner as illustrated.

The above-mentioned Example 1, Example 2 and Example 3 demonstrate the production of monolithic capacitors and a monolithic coil. However, the invention may be applied generally to the production of any monolithic electronic parts, such as monolithic capacitors, coils, piezoelectric parts, varistors, etc.

In the above-mentioned Example 1, the electroconductive film 5 is formed on the ceramic green sheet 2 supported by the carrier film strip 1, and the carrier film strip 1 is peeled off from the ceramic green sheet 2 prior to the lamination of plural ceramic green sheets. However, the first embodiment of the present invention can also employ a different process where the electroconductive film 5 is formed on the ceramic green sheet 2, then the ceramic green sheets 2 are laminated in a cutting head, and thereafter the carrier film strip 1 is peeled from the ceramic green sheet 2. Also employable is still another process where the carrier film strip 1 peeled from the ceramic green sheet 2 prior to the formation of the electroconductive film 5 on said ceramic green sheet 2.

Also employable is a different process where a first ceramic green sheet is formed on a carrier film strip, then an electroconductive film is formed on said first ceramic green sheet, and thereafter a second ceramic green sheet is formed on said electroconductive film. Then, a plurality of such ceramic green sheet structures each having an electroconductive film between a first ceramic green sheet and a second ceramic green sheet are laminated. In this process, the carrier film strip may be peeled from the first ceramic green sheet prior to the formation of the electroconductive film on said first ceramic green sheet, or alternatively, it may be peeled therefrom after the formation of the second ceramic green sheet on the electroconductive film. In addition, the carrier film strip may be peeled from the first ceramic green sheet after the lamination of plural ceramic green sheet structures. This process is especially advantageous in that, since the electroconductive film is formed uniformly and thinly through electroless plating and is embedded between the first ceramic green sheet and the second ceramic green sheet to give a ceramic green sheet structure, the lamination of a plurality of such ceramic green sheet structures is prevented from causing a difference in level in the final ceramic laminate resulting from said lamination.

In the above-mentioned Example 1 and Example 2, the electroconductive films 5 and 15 are formed on the long ceramic green sheet 2 and the long carrier film strip 11, respectively. However, also employable is a different embodiment where an electroconductive film is formed on a ceramic green sheet or a carrier film which has been previously formed in a predetermined shape. In this case, where a liquid of an activating catalyst is applied to such a ceramic green sheet or carrier film formed in a predetermined shape, a spin coating apparatus can be used.

On the other hand, in the above-mentioned Example 3, the electroconductive film 25 is formed on the resin film 22 having a predetermined shape. However, also employable is a different embodiment where an electroconductive film is formed on a long resin film strip, then the thus-coated resin film strip is cut to have a predetermined shape, and thereafter a plurality of the thus-cut resin films are laminated. In this case, where a liquid of an activating catalyst is applied to such a long resin film strip, any roller coating or spray coating apparatus can be used for applying a sprayed liquid of an activating catalyst.

Needless-to-say, the materials and also their proportions constituting the liquid of an activating catalyst, the ceramic slurry and the electroconductive film, which are used in the present invention, may well be varied and modified.

While the invention has been described in detail and with reference to specific embodiments thereof, it will be apparent to one skilled in the art that various changes and modifications can be made therein without departing from the spirit and scope thereof.

What is claimed is:

1. A method for producing monolithic electronic parts, which comprises the steps of:
   preparing ceramic green sheets,
   forming an electroconductive film of a metal on each ceramic green sheet,
   laminating a plurality of such ceramic green sheets each having the electroconductive film formed thereon to give a ceramic laminate, and
   sintering the ceramic laminate;
   in which said step of forming an electroconductive film of a metal on each ceramic green sheet comprises the steps of:
   applying a hydrophilic liquid containing a palladium salt onto each ceramic green sheet to form thereon a photosensitive film which is water-soluble,
   exposing said photosensitive film to light to thereby reduce said palladium salt to a palladium metal catalyst which acts as an activating catalyst for depositing said metal from electroless plating on said film, and
   dipping said ceramic green sheet thus having the palladium catalyst deposited thereon in an electroless plating bath to thereby form through electroless plating in said bath the intended electroconductive film of said metal on a region of said ceramic green sheet where said palladium catalyst is deposited.

2. The method for producing monolithic electronic parts as claimed in claim 1, wherein each said ceramic green sheet is formed on along carrier film strip continuously in its lengthwise direction, and said carrier film strip is peeled from the ceramic green sheet prior to the step of laminating a plurality of such ceramic green sheets.

3. A method for producing monolithic electronic parts, which comprises the steps of:
   preparing a long carrier film strip,
   forming an electroconductive film of a metal on the carrier film strip,
   forming a ceramic green sheet over the carrier film strip having the electroconductive film formed thereon,
   peeling the carrier film strip from the ceramic green sheet to thereby transfer the electroconductive film onto the ceramic green sheet,
   laminating a plurality of such ceramic green sheets each having the electroconductive film transferred there onto to prepare a ceramic laminate, and
   sintering said ceramic laminate;
   in which said step of forming an electroconductive film of a metal on said long carrier film strip comprises the steps of:
   applying a hydrophilic liquid containing a palladium salt onto said carrier film strip to form thereon a photosensitive film which is water-soluble,
   exposing said photosensitive film to light to thereby reduce said palladium salt to a palladium metal catalyst which acts as an activating catalyst for depositing said metal from electroless plating on said film, and
   dipping said carrier film strip thus having the palladium catalyst deposited thereon in an electroless plating bath to thereby form through electroless plating in said bath the intended electroconductive film of said metal on a region of said carrier film strip where said palladium catalyst is deposited.

4. A method for producing monolithic electronic parts, which comprises the steps of:
   preparing a plurality of resin films,
   forming an electroconductive film of a metal on each resin film, and
   laminating said plurality of resin films each having the electroconductive film formed thereon to give a resin film laminate;
   in which said step of forming an electroconductive film of a metal on each resin film comprises the steps of:
   applying a hydrophilic liquid containing a palladium salt onto each resin film to form thereon a photosensitive film which is water-soluble,
   exposing said photosensitive film to light to thereby reduce said palladium salt to a palladium metal catalyst which acts as an activating catalyst for depositing said metal from electroless plating on said film, and
   dipping said resin film thus having the palladium catalyst deposited thereon in an electroless plating bath to thereby form through electroless plating in said bath the intended electroconductive film of said metal on a region of said resin film where said palladium catalyst is deposited.

5. The method for producing monolithic electronic parts as claimed in any one of claims 1 to 4, wherein said liquid containing a palladium salt is a liquid selected from the group consisting of a hydrophilic liquid comprising copper oxalate, a palladium salt and an alkaline solution, and a hydrophilic liquid comprising zinc oxalate, a copper salt, a palladium salt and an alkaline solution.

6. The method for producing monolithic electronic parts as claimed in any one of claims 1 to 4, wherein, in the step of exposing the photosensitive film to light to thereby deposit the activating catalyst thereon, said photosensitive film is exposed to light selectively only at predetermined areas and the non-exposed areas of said photosensitive film are removed by washing them with water or a liquid consisting essentially of water.

7. A method of forming an electroconductive film on a substrate, comprising the steps of:
   applying a hydrophilic liquid containing a palladium salt onto said substrate to form thereon a photosensitive film which is water-soluble,
   exposing said photosensitive film to light to thereby reduce said palladium salt to a palladium metal catalyst which acts as an activating catalyst for depositing a metal from electroless plating on said substrate, and dipping said substrate thus having the palladium catalyst deposited thereon in an electroless plating bath to thereby form through electroless plating in said bath the intended electroconductive film of said metal on a region of said substrate where said palladium catalyst is deposited.

8. The method as claimed in claim 7, wherein said liquid containing a palladium salt is a liquid selected from the group consisting of a hydrophilic liquid comprising copper oxalate, a palladium salt and an alkaline solution, and a hydrophilic liquid comprising zinc oxalate, a copper salt, a palladium salt and an alkaline solution.

9. The method as claimed in claim 7, wherein, in the step of exposing the photosensitive film to light to thereby deposit the activating catalyst, said photosensitive film is exposed to light selectively only at predetermined areas and the non-exposed areas of said photosensitive film are removed by washing them with water or a liquid consisting essentially of water.

10. The method as claimed in claim 7, wherein said substrate is selected from the group consisting of a ceramic green sheet, a carrier film, and a resin film.

* * * * *